United States Patent [19]

Legrix et al.

[11] 4,171,401
[45] Oct. 16, 1979

[54] ARTIFICIAL STRAW MAKING STABLE-LITTERS

[75] Inventors: Georges Legrix, Route de Bordeaux, 64230 Sauvagnon-Pau; Gérard Junca, Jurançon; Michel Bouron, Pau; Pierre Rustul, Orthez, all of France

[73] Assignees: Georges Legrix, Sauvagnon; Ato Chimie, Courbevoie, both of France

[21] Appl. No.: 831,419

[22] Filed: Sep. 8, 1977

[30] Foreign Application Priority Data

Sep. 9, 1976 [FR] France .................. 76 27769
Jul. 18, 1977 [FR] France .................. 77 21870

[51] Int. Cl.² .............................................. B32B 5/16
[52] U.S. Cl. ............................... 428/369; 428/357; 428/397; 428/401; 428/402
[58] Field of Search ............ 428/212, 220, 357, 359, 428/332, 362, 364, 369, 371, 372, 370, 374, 402, 401, 407, 397, 90, 92, 85

[56] References Cited

U.S. PATENT DOCUMENTS

| | | |
|---|---|---|
| 2,000,013 | 5/1935 | Dreyfus et al. ............... 428/400 X |
| 2,354,435 | 7/1944 | Stedman ......................... 428/397 X |
| 3,015,873 | 1/1962 | Dietzsch et al. ............... 428/398 X |
| 3,402,548 | 9/1968 | Wininger et al. .............. 428/397 X |
| 3,565,742 | 2/1971 | Stephens et al. ............... 428/92 X |
| 3,597,312 | 8/1971 | Kohne et al. ................... 428/372 |
| 3,634,570 | 1/1972 | Himelreich, Jr. et al. ..... 428/407 |
| 3,837,980 | 9/1974 | Nishimura et al. ............ 428/92 X |
| 3,940,522 | 2/1976 | Wessells ......................... 428/92 X |
| 4,061,804 | 12/1977 | McCulloch .................... 428/85 X |

*Primary Examiner*—Lorraine T. Kendell
*Attorney, Agent, or Firm*—Burgess, Ryan and Wayne

[57] ABSTRACT

The invention provides artificial straw adapted to be used instead of natural straw for stable litter or the like. This artificial straw is constituted of chips made of a crystalline thermoplastic alimentary polymer having an elongation at rupture of at least 50%, said chips having, when in a flat and stretched condition, a shape and dimensions such that each chip is inscribable in a parallelepiped having a length comprised between 30 and 800 mm, a width comprised between 1 and 20 mm and a height comprised between 0.06 and 12 mm, the thickness of said chips being comprised between 0.06 and 0.8 mm.

18 Claims, 19 Drawing Figures

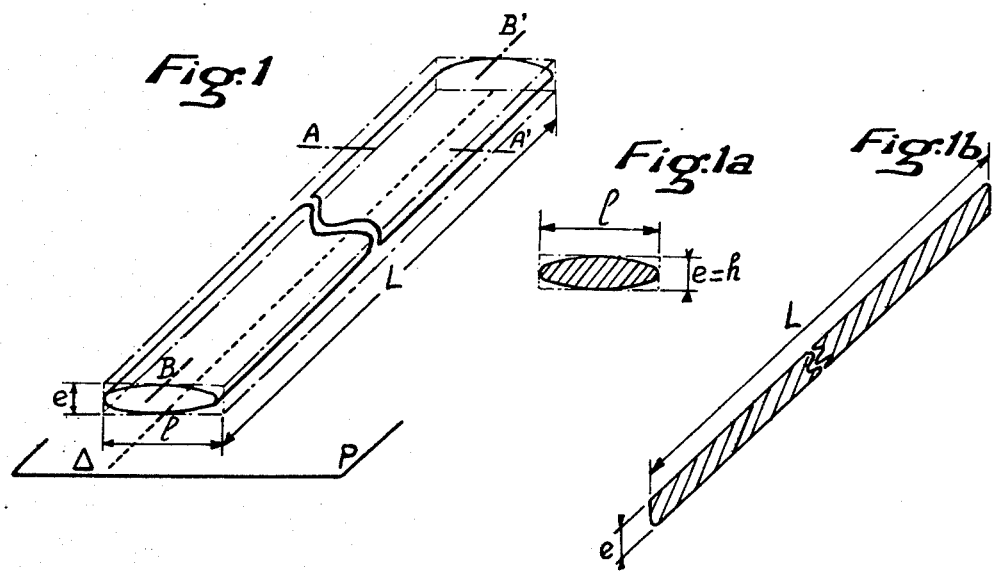
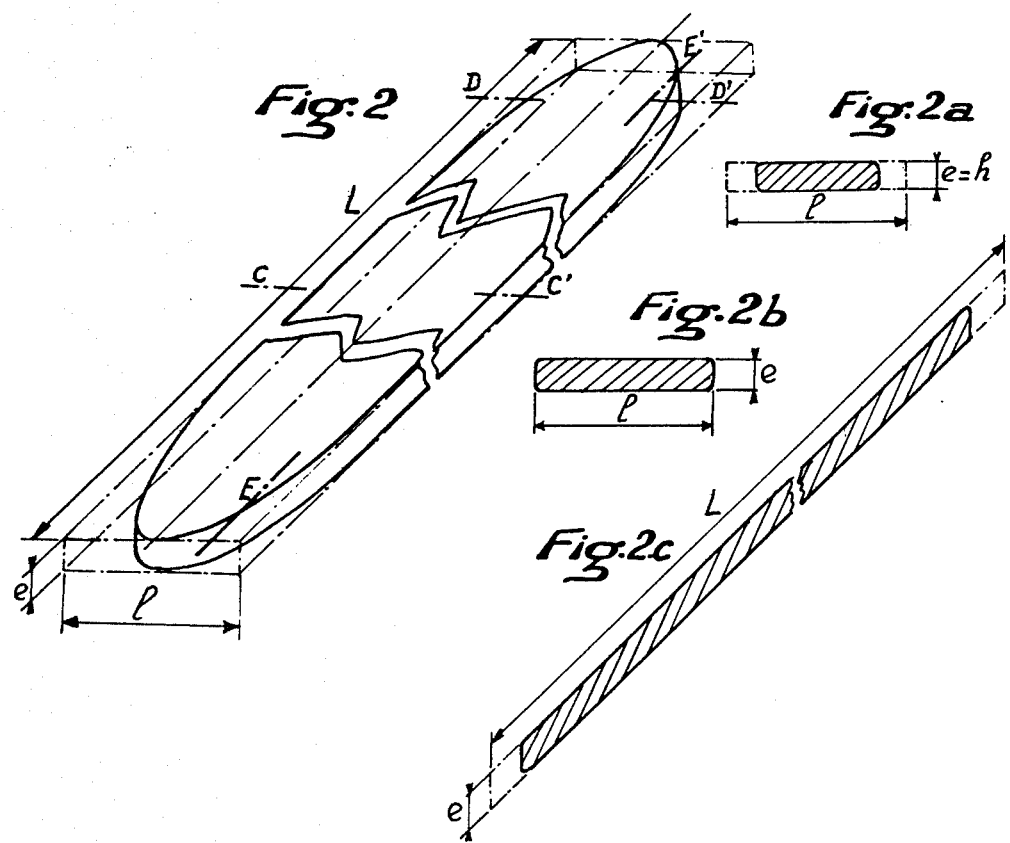

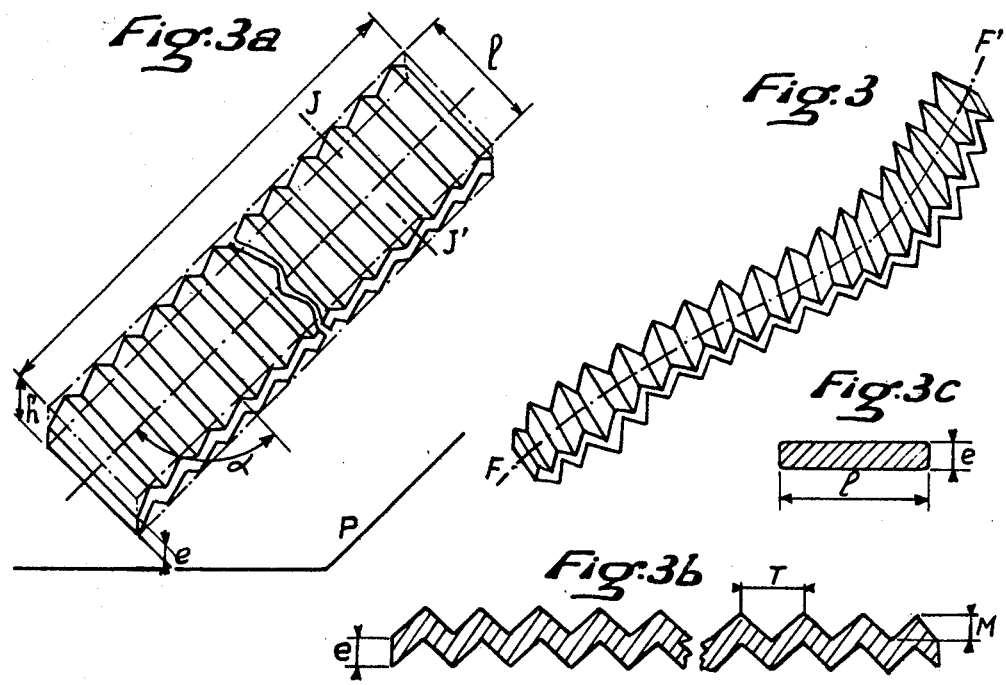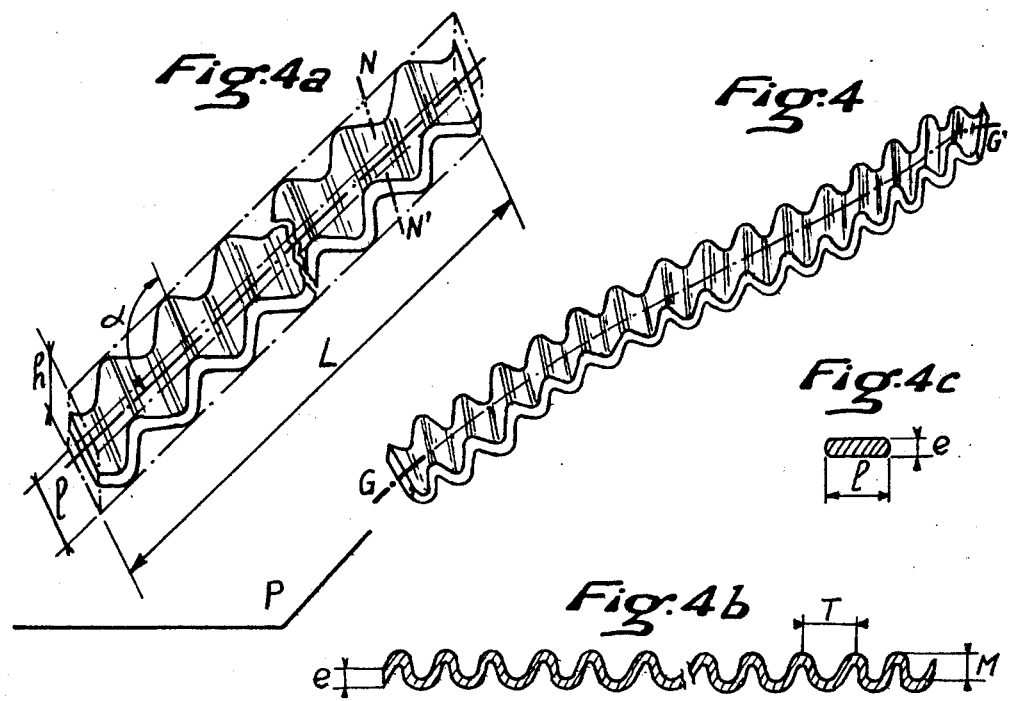

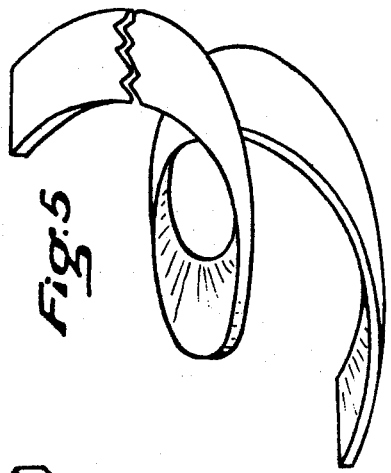
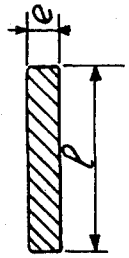
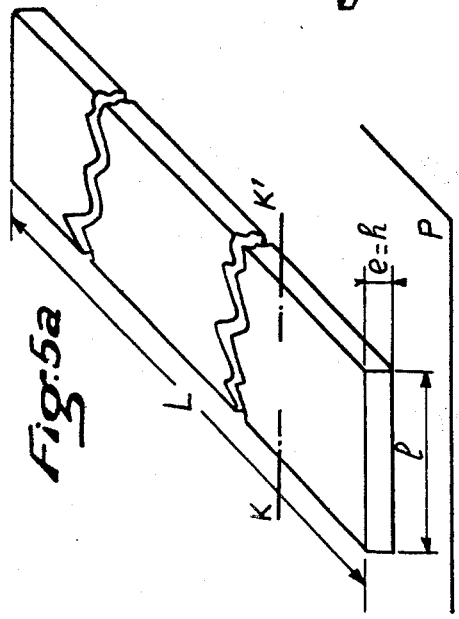
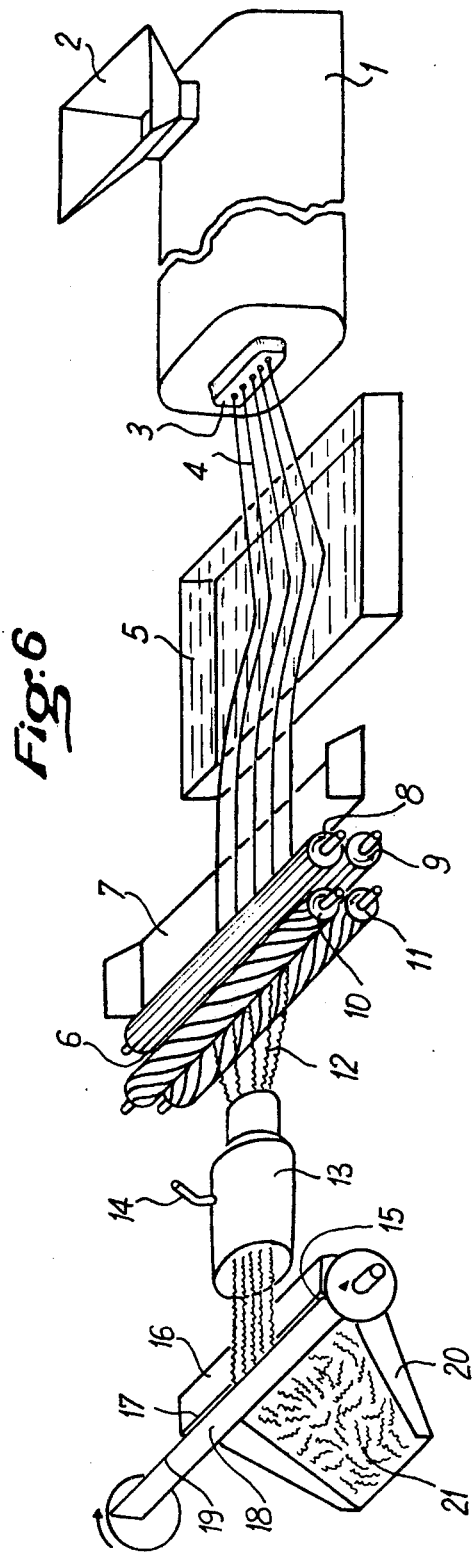

ARTIFICIAL STRAW MAKING STABLE-LITTERS

The present invention relates to artificial straw for making stable-litters adapted to be used by animals such as horses or bovines. The invention is also related to a method for manufacturing such artificial straw, as well as to apparatus for carrying out said method. The instant invention is related furthermore to stable-litters constituted partially or entirely by the above-mentioned artificial straw.

Numerous types of stable-litters are known; in most cases these known stable-litters are contituted by cereal straw, especially corn straw, wheat straw, oat straw, rice straw or barley straw. These known stable-litters do not efficiently absorb the liquids stemming from the dejections of the animals, and this poor absorption results in fermentation of the litter and the dejections, whereby malodorous and dangerous ammoniacal gases are set free. Furthermore, the oat straw is easily crushed while the barley straw contains pointed husks or chaffs which may irritate the skin of the animals. Apart from the cereal straw it has also been proposed to use sawdust, peat, moss and even dried leaves for constituting stable-litters. However, products of this kind have considerable drawbacks in that they involve acid reactions which may result in softening the horn of the hooves of the animals, especially the hooves of horses. Furthermore, when the above-mentioned sorts of straw are put in place in the stable they produce considerable quantities of dust which is deleterious to the animals, especially to horses, as well as to the personnel manipulating the straw.

It is an object of the invention to provide artificial straw adapted to be used for building up stable-litters, which straw replaces advantageously the conventional straw used to this end, without having the above-mentioned drawbacks of said conventional straw.

Amongst its main advantages the artificial straw according to the invention has a soft touch and a very reduced weight; it is imputrescible, it does not absorb the dejections of the animals; indeed the liquid dejections flow into the channel or groove provided to this end, the artificial straw may easily be cleaned by means of water, for instance of a water-jet or in a washing machine, the thus cleaned or washed straw being able to be re-used several times which results in a comparatively long service-life of the straw. Furthermore, this artificial straw can be handled by means of a fork in the same manner as cereal straw and, contrary to the latter, it does not produce any dust or other particles deleterious to the animals or the personnel. The artificial straw may also be bundled or trussed by means of machines of the type currently used for cereal straw or hay. Also, due to the fact that the novel artificial straw is easy to handle and that it suffices to replace only the soiled part of said straw to obtain a clean stable-litter, the litters for the boxes adapted to receive the animals, espcially horses, can be prepared more rapidly than litters constituted by conventional straw.

The artificial straw for making stable-litters according to the present invention has the form of chips of a polymeric substance selected from a group of alimentary crystalline thermoplastic polymers the elongation at rupture of which is at least equal to 50%, said chips having, in the flat and stretched state, a shape and dimensions such that they are inscribed in parallepipeds having a length comprised between 30 and 800 millimeters, a width comprised between 1 and 20 mm and a height comprised between 0.06 and 12 mm, said chips having furthermore a thickness comprised between 0.6 and 0.8 mm.

It is to be understood that in the present description the term of "alimentary polymer" or "alimentary plastic material" or the like is to be construed as designating plastic materials which can be used for packing food.

In one embodiment of the present invention the above-mentioned chips have, when in a flat and stretched state, a shape and dimensions such that they can be inscribed in parallepipeds the length of which is comprised between 100 and 600 mm, the width of said parallepipeds being comprised between 2 and 15 mm and their height being comprised between 0.1 and 8 mm, said chips having furthermore a thickness comprised between 0.1 and 0.6 mm.

When the artificial straw has to be used for making stable-litters for horses or bovines or similar animals, said chips have preferably, in the flat and stretched state, a shape and dimensions such that they can be inscribed in parallelepipeds having a length comprised between 150 and 400 mm, a width comprised between 2.5 and 8 mm, and a height comprised between 0.15 and 6 mm, said chips having furthermore a thickness comprised between 0.15 and 0.5 mm.

The expression "in the flat and stretched state" as used with reference to the chips in the present description and the appended claims is meant do describe chips one of the large surfaces of which is placed on a plane while the chips are not submitted to any tensile stress, the longitudinal direction of the chips being substantially rectilinear.

Furthermore, the thickness of a chip is defined as being the smallest dimension of the rectangle in which the surface resulting from the section of the chip in the flat and stretched state with a plane perpendicular to the longitudinal axis of said chip can be inscribed.

In the artificial straw according to the present invention the chips are randomly distributed and are not interconnected. These chips may have regular or irregular shapes. However, it is necessary that they do not have substantial protuberances which might hurt the animals placed onto the stable-litters made up from said artificial straw.

The above-mentioned chips may have the shape of substantially rectilinear or spiral ribbons, having, in the flat and stretched state, substantially rectangular, oval or semi-oval longitudinal and transverse cross-sections, and said transverse or longitudinal cross-sections may have, as the case may be, substantially constant dimensions from one zone to the other of any individual chip, as is the case, for instance of a substantially parallelepipedic ribbon, or the above-mentioned longitudinal or transverse sections may have variable dimensions.

The chips may also have the form of substantially rectilinear or spiral ribbons, and they may be corrugated or waved over a part of their length or over their entire length, said ribbons having longitudinal cross-sections corresponding schematically to broken or wave-shaped lines and sections, in the direction of the waves or undulations, which are substantially rectangular, oval or semi-oval, said longitudinal section or sections in the direction of the corrugations or undulations having constant or variable dimensions.

When the chips constituting the artificial straw are waved or undulated, the amplitude and the periodicity of the undulations or waves may vary within comparatively broad limits. Advantageously the amplitude of the undulations or waves is comprised between 0.5 and 10 mm, preferably between 1 and 6 mm. As far as the periodicity of the undulations or waves is concerned, this should be selected in such a manner that there are 1 to 10 undulations or waves per 10 mm. In a preferred embodiment of the invention the direction of said undulations or said waves is inclined under an angle larger than 45°, preferably under an angle comprised 60° and 80° with repect to the longitudinal direction of the chips.

As indicated hereinabove the polymeric substance from which the chips are made is selected from the group comprising the alimentary crystalline thermoplastic polymeric substances having an elongation at rupture at least equal to 50%, said elongation being determined in accordance with Standard ASTM-D-638. According to this definition the terms "crystalline" and "alimentary" as applied to thermoplastic polymers indicate that said thermoplastic polymers exhibit on the one hand a crystalline phase when examined by the X-ray diffraction test (crystalline polymers) and that on the other hand they are not toxic for the animals when absorbed by the latter; furthermore said thermoplastic polymers do not cause any irritation of the skin of said animals (alimentary polymers).

Amongst the polymers that can be used for preparing the chips with a view to manufacturing artificial straw in accordance with the present invention the following may be cited as being particularly advantageous: olefin homopolymers containing 2 to 8 carbon atoms, particularly polyethylene, such as low-density polyethylene or high-density polyethylene, polypropylene, polybutene-1, crystalline ethylene-propylene or ethylene-butene-1 copolymers, copolymers of ethylene and vinyl or acrylic esters constituted mainly by ethylene, especially copolymers of ethylene and vinyl acetate and copolymers of ethylene and alkyl acrylate or methacrylate, which contain a crystalline phase, copolymers obtained by the polymerisation of styrene in the presence of polybutadiene, polyisoprene or in the presence of an amorphous ethylene-propylene copolymer, which presents a crystalline phase, polyamides, and mixtures of such polymers. In this group of polymers the preferred polymers for manufacturing the chips are for instance polyethylene, polypropylene, polybutene-1,crystalline copolymers of ethylene and propylene or butene-1 and mixtures of such polymers and copolymers.

If necessary, various additives may be added to the polymeric substance, the nature and the amount of such additives being so selected that the obtained composition provides chips exhibiting the required mechanical properties without being toxic when absorbed by the animals, and while not causing any irritation of the skin of the animals.

It is possible, for instance, to add 50 to 1000 ppm of a phenolic antioxidant such as di-tertiobutylparacresol,4,4'-thiobistertiobutyl metacresol, β-octadecyl [(3,5di-tertiobutyl 4-hydroxy) phenyl]-propionate to the polymeric substance. The latter may also contain a photophysical absorber, especially benzophenone or substituted benzophenone which acts as a stabilizer against the effects of ultra-violet radiation, this absorber being added in an amount up to 1% by weight preferably comprised between 0.2 and 0.6% by weight of the polymeric substance. This polymeric substance may also contain pigments, especially $TiO_2$ and $Fe_2O_3$ or organic dyes in a convenient proportion, for example up to about 1%, so as to confer the desired coloration to the straw.

In one particular embodiment of the invention the artificial straw is constituted by chips of the above-defined kind and have furthermore an expanded structure. This result is obtained by shaping said chips from an expanded substance produced from compositions which contain the polymeric substance, and alimentary expansion agent, especially azodicarbonamide in an sufficient amount, for instance 500 to 5000 ppm with respect to the polymeric substance, possibly said compositions may also contain other desired additives. According to a preferred feature of this embodiment the expanded substance resulting from the expansion of the polymeric substance under the effect of the expansion agent, which expanded substance is used for shaping the chips, has a density comprised between 0.5 and 0.7.

In another embodiment of the invention the chips constituting the artificial straw are shaped from a composition containing the polymeric substance and an inert filler, for instance talcum or calcium carbonate, and possibly other conventional additives (antioxidant, pigment, dye, stabilizer), the amount of the filler being 10 to 50%, preferably 20 to 40% of the total weight of the polymeric substance and the filler.

These additives, especially antioxidants, stabilizers, pigments, dyes, plastifiers, expansion agents as well as the inert fillers, which are selected from the group of additives and fillers considered as "alimentary" (i.e. not toxic when absorbed by the animals and causing no irritation of the skin of the animals), are incorporated in the polymeric substance according to operating modes well known in the art, for instance by directly mixing all the ingredients or by preparing first a so-called "pilot mixture" of the additives and/or the inert filler with a portion of the polymeric substance, and then incorporating said pilot mixture in the remainder of the polymeric substance, while selecting convenient proportions of said pilot mixture with a view to obtaining the required additive and filler concentration in the final mixture which is used for manufacturing the chips. The mixing operations may be carried out in a barrel, in an extruder, or in any other convenient device currently used to this end.

The chips constituting the artificial straw according to the invention may also have a double-layer or multi-layer structure resulting from the superposition of two or more layers made of the above-indicated polymeric substances.

The artificial straw according to the invention may be produced from the selected polymeric substance which possibly contains the desired additives and fillers, by any method allowing chips and especially ribbons having a convenient shape and convenient dimensions to be obtained.

It is possible, for instance, to prepare a full or tubular round billet from the polymeric substance and to shape this billet, by conveniently machining the same, into chips having the selected shape and dimensions.

It is also possible to extrude the polymeric substance in the molten state through a plurality of concentric slots and to cut from the resulting tubular extrudates chips having a selected thickness and length, using a rotating tool provided with knives which are arranged in recesses placed in front of the extrusion slots; in this case, the thus shaped chips will be unrolled through said recesses.

One method which is particularly adapted to be used to manufacturing the artificial straw according to the invention consists in producing an extrudate having the form of one or several strings, or a sheath or a sheet constituted by the polymeric substance which possibly contains convenient additives (antioxidants, dyes, stabilizers, pigments, expansion agents) and inert fillers, to cause the extrudate to pass through a shaping zone at a temperature lower than the melting point of the polymeric substance, so as to adjust the thickness and the width of said extrudate to the desired values, said thickness corresponding to the thickness of the chip to be obtained while said width represents the width or the length of the chip to be obtained, depending on whether the extrudate has the form of a string or the form of a sheet or a sheath, then submitting the thus shaped extrudate to a cutting operation to cut it to the desired length or to the desired width depending on whether said extrudate has the form of a string or the form of a sheet or sheath, said length or width corresponding to the length or width of the chip to be obtained, and collecting the chips resulting from said cutting operation.

The temperature of the extrudate in the shaping zone, which must be lower than the melting temperature of the polymer substance should be lower than 100° C. and be comprised preferably between 40° and 70° C. If necessary the extrudate is cooled by passing through a liquid such as water between the zone of formation and the shaping zone of the extrudate so as to bring the temperature of the latter down to a convenient value for the shaping operation.

In the shaping zone the thickness and the width of the extrudate may be brought to the selected respective values, while the surface of the extrudate remains smooth. It is also possible during the shaping operation to confer a waved or undulated form to the extrudate over its entire surface or over part of said surface. The amplitude and the periodicity of the undulations or waves may vary within comparatively broad limits. Advantageously said amplitude is comprised between 0.5 and 10 mm, preferably 1 and 6 mm and said periodicity is selected so that there are 1 to 10 undulations or corrugations/10 mm. The direction of these undulations or corrugations (waves) may be parallel or perpendicular to the direction of formation of the extrudate, or may be inclined under an intermediate angle between the above-mentioned two extreme orientations. In a preferred embodiment of the invention the direction of the undulations or waves formed in the shaping zone is inclined under an angle of more than 45°, and particularly under an angle comprised between 60° and 80° with respect to the direction of formation of the string or with respect to a direction perpendicular to the direction of the formation of the sheet or sheath.

The chips resulting from the cutting operation may be received in a bundling zone wherein they are bundled by applying a known method for bundling conventional straw such as cereal straw.

When it is desired to prepare artificial straw constituted by chips having a foamed or expanded structure or containing an inert filler, an expanded or filler-loaded extrudate is formed from the polymeric substance containing an expansion agent or an inert filler the nature and amount of which correspond substantially to those indicated hereinabove, the expanded or filler-loaded extrudate being then submitted to a shaping operation and afterwards to a cutting operation, in the same manner as in the case where a non-expanded extrudate or an extrudate without an inert filler is used.

It is also possible to prepare an extrudate in the form of a composite sheet comprising two or more layers, such sheet being obtained by co-extrusion (simultaneous extrusion) of two or more individual sheets constituted by the selected ones of the polymeric substances indicated herein-above; after shaping such extrudate and cutting the thus shaped extrudate a spiral-formed chip may be obtained from the double-layer or multi-layer sheet obtained by the above-mentioned co-extrusion operation.

According to the present invention apparatus for carrying out the above-described method of manufacturing artificial straw by forming an extrudate possibly containing additives or the like and possibly expanded, shaping said extrudate and the cutting it into chips, comprises an extrudate having a nozzle adapted to form an extrudate in the form of strings, ribbons, sheets, possibly co-extruded, or in the form of a sheath, said apparatus further comprising a shaping system arranged downstream of said extruder and comprising two mutually superimposed shaping rolls having parallel axes and defining between them a zone the thickness of which may be varied by varying the distance between said axes, and driving means for rotatively driving said rolls in mutually opposed angular directions, and a cutting system arranged downstream of said shaping system, said cutting system comprising a fixed knife the edge of which is adapted to support the shaped extrudate issuing from the shaping system, said cutting system further comprising at least one movable knife having an edge parallel to the edge of said fixed knife and adapted to be applied onto said edge of said fixed knife, said apparatus further comprising means for driving said movable knife in such a manner that the edge of the latter passes cyclically along the edge of said fixed knife.

The shaping rolls may have a lateral surface which is smooth or which is formed with grooves. In a particular embodiment said shaping rolls have their surfaces formed with oblique grooves the angle of inclination of which is so selected that they produce on the chips to be manufactured undulations or waves forming with the longitudinal axis of the chip an angle larger than 45°, preferably an angle comprised between 60° and 80°.

Where desirable, the shaping system may comprise two driving rolls arranged upstream of said shaping rolls and constituted by two mutually superimposed rolls that are preferably provided with longitudinal grooves, the respective axes of said driving rolls being parallel to each other and perpendicular to the direction of extrusion, the distance between the respective peripheries of said rolls being adjustable by varying the distance between the axes of said rolls, which latter are driven rotatively in mutually opposed angular directions by convenient means comprising a motor.

The above-described apparatus may also comprise a cooling chamber or cell arranged between the outlet of the nozzle of the extruder and the inlet of the shaping system, said chamber or cell being advantageously constituted by a container containing a convenient cooling liquid, such as water, at a convenient temperature, wherein the extrudate is immersed.

It is also possible to interpose between the outlet of the shaping system and the cutting system an aspirating system constituted by a venturi system and adapted to receive the shaped extrudate issuing from said shaping system and to transfer said extrudate to the cutting system.

In one embodiment of the invention a bundling device adapted to receive the chips constituting the artificial straw and to bundle the same is placed adjacent the outlet of the cutting system.

The present invention will now be described in a more detailed manner with reference to the appended drawings which show, by way of example but not of limitation, various embodiments of the invention.

FIGS. 1, 1a and 1b show a chip according to the invention, and, more particularly, the transverse and longitudinal sections of said chip, respectively.

FIGS. 2, 2a, 2b and 2c show an oval chip, as well as the transverse and longitudinal sections thereof.

FIGS. 3, 3a, 3b and 3c show a corrugated zig-zag-shaped chip in the flat and stretched condition, as well as the longitudinal and transverse sections of said chip.

FIGS. 4, 4a and 4b and 4c, respectively show an undulated or waved chip according to the invention in the flat and stretched condition, as well as the longitudinal and transverse section of said chip.

FIGS. 5, 5a and 5b show a flat spiral chip and its longitudinal and transverse sections.

FIG. 6 shows apparatus for manufacturing chips such as the one shown in FIGS. 3 to 3c.

The chip shown schematically in FIG. 1 is a substantially rectilinear ribbon having a substantially oval constant cross-section or transverse section, said section—as indicated, for instance, by A,A'—being shown in FIG. 1a; said chip further has a variable rectangular longitudinal section. When this chip is placed onto a plane P in a flat and stretched condition it defines a line of contact Δ with this plane. The ribbon in its flat and stretched condition is inscribable in a parallelepiped which in the embodiment shown is rectangular and indicted in the Figures by dash-dot lines; said parallelepiped has a length L, a width l and a height h equal to the thickness e of the chip, which are all comprised in the above-defined intervals. The longitudinal section of the ribbon has a surface area which varies from nil when the plane of section is tangent to the chip to a maximum value (FIG. 1b) when the plane of section B,B' passes through the longitudinal axis of the chip. The maximum longitudinal section of the chip is a rectangle having a length L and a width l, whereas the cross-section of said chip is represented by an oval inscribable in the rectangle having a length l and a width e.

FIG. 2 schematically shows a chip which in its flat and stretched condition has the shape of a prism with two parallel planar surfaces in the form of an oval, said chip being inscribable in a rectangular parallelepiped indicated in dash-dot lines, said parallelepiped having a length L, a width l and a height h which is equal to the thickness e of the chip, all of which are comprised in the appropriate intervals. This chip has variable rectangular cross-sections one of which dimensions is equal to e (thickness of the chip), while the other dimension varies as a function of the position of the plane of section between nil and a value equal to l (section c, c', as indicated in FIG. 2b), while passing, between these limit-values, through intermediate values (section B,B' as indicated in FIG. 2a); the chip furthermore has a longitudinal section in the form of rectangles one of the dimensions of which is equal to e while the other dimension varies from nil to a value equal to L while passing, between these limit-values, through intermediate values (section E, E' as indicated on FIG. 2c).

The chip schematically shown in FIG. 3 has the shape of an accordion-like ribbon which is corrugated in zig-zag manner. The ridges of said ribbon are regularly spaced with an amplitude M and a period P which may be comprised, for example, in the previously defined intervals, said ridges being arranged in a direction which forms with the longitudinal axis of the chip an angle α comprised preferably between 60° and 80°. When this ribbon is in its flat and stretched condition it is inscribable in a rectangular parallelepiped having a length L, a width l, and a height h, comprised within the desired intervals. The cross-section of the chip is constant and represents a rectangle having a length l and a width e (section J,J' as indicated in FIG. 3c), whereas the longitudinal section of said chip has the form of a ribbon with a thickness e, said ribbon extending along an accordion-like broken line (section F,F' as indicated in FIG. 3b), e designating the thickness of the chip.

FIG. 4 shows a chip having the form of an undulated ribbon the regularly spaced undulations of which have an amplitude M and a period T, said undulations having a direction which forms an angle α comprised substantially between 60° & 80° with the axis or the longitudinal direction of the chip. When said chip is in the flat and stretched condition, it is inscribable in a rectangular parallelepiped having a length L, a width l and a height h, which are comprised in the desired intervals such as defined herein-above (cf. FIG. 4a). The cross-section of the chip in the direction of the undulations (section H, H' as indicated in FIG. 4a) is constant and has substantially the shape of a rectangle having a length l and a width substantially equal to the thickness e of the chip (cf. FIG. 4c), whereas the longitudinal section of said chip has the form of an undulated ribbon having a thickness substantially equal to e (section G,G' as indicated in FIG. 3b), the amplitude of said undulations being indicated by the reference letter M, while their period is indicated at T.

The chip shown in FIG. 5 is a spiral chip which, when in its stretched and flat condition, has the shape of a rectangular parallelepiped (cf. FIG. 5a) having a length L, a width l and a height h equal to the thickness e of the chip. The cross-section of this chip, (i.e. the section K,K' as indicated in FIG. 5a) has the form of a rectangle (cf. FIG. 5b) the length of which equals l and the width of which equals e.

The apparatus schematically shown in FIG. 6 comprises a screw extruder 1 provided with a hopper 2 by which the polymeric substance or the mixture of polymeric substance with the additive or additives (anti-oxidant, stabilizer, pigment, dye, plastifier, expansion agent) and/or the inert filler (talcum, $CaCO_3$) is introduced into the extruder, as well as an extrusion die 3 through which said polymeric substance or said mixture issues from the extruder in the form of extrudate 4. The extruder shown in the drawing, is provided with a die allowing of extruding the polymeric substance or the mixture of said polymeric substance with the additives and/or the inert filler in the form of strings 4. It is also possible to use other extruders provided with dies which allow of producing an extrudate in the form of a sheet or a sheath; it is possible, too, to produce a sheet constituted by two co-extruded basic sheets. A cooling cell 5 constituted substantially by a container filled with water is arranged downstream of the die for cooling the extruded strings. Downstream of the said cooling cell a shaping system 6 is provided which comprises an inlet channel 7 for the strings, two superimposed driving rolls 8 and 9 the axes of which are parallel to each other and perpendicular to the direction of extrusion, said rolls being provided with longitudinal grooves and defining between them a passage zone the thickness of which is adjustable by varying the distance between the axes of said rolls; downstream of said driving rolls the shaping system comprises two shaping rolls 10 and 11 which are superimposed to each other and the axes of which are parallel to each other and perpendicular to the direction of extrusion; said shaping rolls also define between them a zone the thickness of which is adjustable by varying the distance between the axes of said shaping rolls. In the embodiment shown the shaping rolls are constituted by two helical gears the helical grooves of which are inclined under an angle of 20° with respect to the axes of the gears, whereby the strings passing through the interval between said two gears are shaped into a corrugated accordeon-like form as shown in FIG. 3. The shaping system further comprises known means (not shown) such as a motor for rotatively driving the driving rolls on the one hand, and the shaping rolls on the other hand in such a way that the driving rolls rotate in respective opposed angular directions and that the shaping rolls also rotate in respective opposed angular directions so as to feed the strings in the extrusion direction; said shaping system also comprises known means (not shown) for adjusting the interval defined between the driving rolls and the interval defined between the shaping rolls by varying the relative position of the axes of said rolls, or, in other words, by varying on the one hand the distance between the respective axes of the driving rolls and, on the other hand, the distance between the respective axes of the shaping rolls. The shaping rolls 10 and 11 which in the embodiment shown in FIG. 6 are cylindrical and provided with helical grooves may have different shapes and be provided with other types of grooves; they may also have a substantially smooth surface, depending on the pattern of the chips to be produced. An aspirating system 13 is arranged downstream of the shaping system and receives the shaped strings 12 issuing from said shaping system. This aspirating system is constituted by a venturi tube defining a passage zone which comprises in a manner known per se a convergent inlet zone connected to a divergent outlet zone, as well as a conduit 14 for introducing pressurized air, which conduit opens into the convergent zone adjacent the narrowest portion of the latter. A cutting system 15 is arranged downstream of the aspirating system 13 and comprises a fixed knife 16 the rectilinear edge 17 of which supports the shaped extrude issuing from the aspirating system, said cutting system further comprising a rotative knife 18 having a rectilinear edge 19 which is parallel to the edge 17 of the fixed knife. Edge 19 of the rotative knife is adapted to be pressed against the edge 17 while being rotated. A channel 20 mounted on the lower part of the cutting system allows the chips 21 obtained by cutting the shaped strings to be collected.

The cutting system furthermore comprises means (not shown) including a motor for driving the rotary knife and for causing the edge of said knife to pass cyclicly along the edge of the fixed knife. The frequency of the passage of the edge of the movable knife along the edge of the fixed knife may be adjusted by varying the rotating speed of the movable knife in a manner known per se, e.g. by means of a variable speed transmission device interposed between the movable knife and the associated driving motor.

The above-described apparatus operates as follows:

The polymeric substance selected for manufacturing the chips is introduced alone or together with convenient additives and/or convenient fillers into the extruder 1 through hopper 2. Said polymeric substance issues from the extruder through extrusion die 3 in the form of strings 4 which are cooled to a convenient temperature, preferably to a temperature comprised between 40° and 60° C., by passing through the water contained in container 5 which constitutes the cooling cell. The thus cooled strings are fed into the shaping system by the receiving channel 7 associated to said system and under the action of the driving rolls 8 and 9 of the shaping system, between which rolls said strings 4 are transported by friction; the strings penetrate the space or interval defined between the above-described helical gears 10 and 11 which constitute the shaping rolls of the shaping system. The height of this interval is so selected that at the outlet of the shaping system, i.e. after the passage of the strings through the shaping rolls, the shaped strings have a width l, a thickness e and an accordion-like corrugated profile defined by period T and amplitude M of the ridges, as indicated in FIG. 3. The shaped strings 12 issuing from the shaping system 6 are aspired by the aspirating system 13 under the action of the pressurized air injected through conduit 14 into the convergent portion of the convergent-divergent passage zone of said aspirating system defining a venturi tube, and are transported towards the fixed blade 16 and the movable blade 18 of the rotary knife 15 where they are cut into chips 21 having the desired length. This length is defined by conveniently selecting the rotative speed of the movable blade of the rotary knife, taking into account the feeding speed of the strings. The shaped chips 21 are collected in the channel 20 from where they are removed towards a shelving zone. Channel 20 may feed the chips for instance to a bundling machine which bundles the thus formed chips.

When used for making stable litters the artificial straw according to the invention is constituted by a high number of chips of a kind described herein-above which are randomly distributed and not interconnected; this artificial straw is placed in a convenient amount and in a uniform manner into the boxes for the animals, for example by means of a fork as usual in the case where conventional cereal straw is used for making stable litters. It is not necessary to replace each time the entirety of the stable litter of a given box; it suffices indeed to replace only the soiled portion of the stable litter which, in most cases, does only represent a small section of said stable litter. The soiled straw can be cleaned by washing by means of a water spray or by means of a machine, and the thus cleaned straw can be re-used after drying as long as its mechanical properties and its aspect remain acceptable.

The artificial straw according to the invention may be used for making stable litters for various animals, especially for farm animals, for animals kept in menageries, for horses kept in racing stables, said artificial straw can even be used for making litters for animals, especially horses, being transported by train, ship or airplane.

The invention will be described hereinafter in a more detailed manner by means of an example which is given by way of illustration but not of limitation.

EXAMPLE

Polyethylene having a melt index of 0.3 and which had been coloured so as to present a straw-yellow hue by adding 0.2% $TiO_2$ and 0.005% $Fe_2O_3$ was used for preparing chips by means of apparatus similar to that schematically shown in FIG. 6, said chips having the form of accordion-like corrugated ribbons as indicated in FIGS. 3 to 3c. These chips, when in their flat and stretched condition, had the form of an accordion-like ribbon inscribable in a rectangular parallelepiped having a length of about 320 mm, a width of about 5 mm and a height of about 2.5 mm, the thickness of said chips being about 0.4 mm. This corrugated accordeon-like ribbon had regularly spaced corrugations or ridges, the amplitude M of which was equal to about 2 mm and the period of which was equal to about 4 mm; the direction of said corrugations or ridges forming an angle of about 80° with the longitudinal axis of the chip.

A stable-litter for a horse-box was prepared using 100 kg of the artificial straw constituted by such chips which were randomly distributed and not interconnected. The horse which was placed onto said stable litter did not show any sign of difficulty to adapt itself to the litter, and its behaviour was similar to that of a horse placed onto a conventional stable-litter made of cereal straw. Each time the stable-litter of this box was remade, only the soiled portion of the litter was replaced, while the remainder of the litter was left in place as being immediately re-usable; for remaking the litter about 10 kg artificial straw (i.e. about 1/10 of the amount which would have been necessary if the stable-litter were constituted by cereal straw and would consequently have to be replaced entirely) were used. Furthermore, the soiled straw was cleaned after each remake of the litter, said cleaning operation being performed by a water-spray, and after drying the cleaned straw could be re-used until its mechanical properties and its aspect had become unacceptable. Under these conditions the total amount of the artificial straw initially put into the box was replaced after only three months with fresh straw, i.e. with straw which had not been submitted to any intermediate cleaning operation.

Tests have also been run with artificial straw constituted by polypropylene or a crystalline copolymer of ethylene and propylene containing 10% by weight of ethylene and containing also the same additives as those which have been used for the above-mentioned polyethylene chips; these polyethylene or copolymeric chips have the form of ribbons similar to those shown in FIG. 5, which ribbons have in their flat and stretched condition the form of a rectangular parallelepiped having a length of about 320 mm, a width of about 6 mm and a height of about 0.5 mm, said height being equal to the thickness of the chip. These chips were prepared by means of apparatus similar to that shown in FIG. 6, however the apparatus used was provided with shaping rolls having a substantially smooth surface without grooves. The results obtained were similar to those obtained when using the artificial straw constituted by polyethylene chips.

The present invention is not limited to the above-described embodiments and examples; numerous modifications may be made by any person skilled in the art, within the scope of the invention as defined in the appended claims.

What is claimed is:

1. A stable litter comprising loose chips composed of a polymeric substance selected from the group consisting of crystalline thermoplastic alimentary polymers having an elongation at rupture of at least 50%, and having, when in the flat and stretched condition, a shape and dimensions such that each chip is inscribable in a parallelepiped having a length comprised between 30 and 800 mm, a width comprised between 1 and 20 mm and a height comprised between 0.06 and 12 mm, the thickness of said chips being comprised between 0.06 and 0.8 mm.

2. The stable litter according to claim 1, wherein said chips, when in their flat and stretched condition, are inscribable each in a parallelepiped having a length comprised between 100 and 600 mm, a width comprised 2 and 15 mm and a height comprised between 0.1 and 8 mm, the thickness of said chips being comprised between 0.1 and 0.6 mm.

3. The stable litter of claim 2, wherein said chips, when in their flat and stretched condition, have each a form and dimensions such as to be inscribable in a parallelepiped having a length comprised between 150 and 400 mm, a width comprised between 2.5 and 8 mm and a height comprised between 0.15 and 6 mm, the thickness of said chips being comprised between 0.15 and 0.5 mm.

4. The stable litter according to claim 1, wherein said chips are in the form of substantially rectilinear or spiral ribbons, said ribbons having each, when in its flat and stretched condition, a longitudinal section substantially rectangular in shape and a substantially rectangular, oval or semi-oval cross-section.

5. The stable litter according to claim 1, wherein said chips are in the form of substantially rectilinear or spiral ribbons which are undulated or corrugated in a zig-zag manner over at least part of their length and the longitudinal sections of which represent broken or undulated lines, while their sections in the direction of the corrugations or undulations are substantially rectangular, oval or semi-oval.

6. The stable litter according to claim 5, wherein the amplitude of said undulations or corrugations of the chips is comprised between 0.5 and 10 mm.

7. The stable litter according to claim 5, wherein the periodicity of the undulations or corrugations of said chips is so selected that each chip comprises 1 to 10 undulations or corrugations per 10 mm.

8. The stable litter according to claim 5, wherein the direction of said undulations or corrugations of the chips is inclined under an angle larger than 45°, with respect to the longitudinal direction of the chip.

9. The stable litter according to claim 1, wherein said polymeric substance constituting said chips is selected from the group consisting of olefin homopolymers having 2 to 8 carbon atoms, crystalline copolymers of ethylene and propylene or butene-1, copolymers of ethylene and vinyl esters or acrylic esters containing a major proportion of ethylene, copolymers obtained by the polymerization of styrene in the presence of polybutadiene, polyisopropene or an amorphous ethylene-/copolymer, polyamides and mixtures thereof.

10. The stable litter according to claim 9, wherein the polymeric substance constituting said chips is selected from the group consisting of polyethylene, polypropylene, polybutene-1, crystalline copolymers of ethylene and propylene or butene-1, and mixtures thereof.

11. The stable litter according to claim 1, wherein said chips have an expanded structure.

12. The stable litter according to claim 1, wherein said chips are produced from a polymeric substance containing an inert filler of the alimentary type, the amount of said filler representing 10 to 50%, of the total weight of the polymeric substance and the inert filler.

13. The stable litter according to claim 1, wherein said chips are produced from a polymeric substance containing an additive selected from the group consisting of pigments, dyes, stabilizers, anti-oxidants, and plastifiers of the alimentary type.

14. The stable litter according to claim 1, wherein said chips have a double-layer or multi-layer structure resulting from the superposition of two or more layers of polymeric substance.

15. The stable litter according to claim 6 wherein the amplitude of said undulations or corrugations of the chips is between 1 and 6 mm.

16. The stable litter according to claim 8 wherein the direction of said undulations or corrugations of the chips is inclined under an angle between 60° and 80°.

17. The stable litter according to claim 12 wherein the inert filler is talcum or calcium carbonate.

18. The stable litter according to claim 12 wherein the filler is present in an amount varying between 20 and 40% of the total weight of the polymeric substance and the inert filler.

* * * * *

UNITED STATES PATENT AND TRADEMARK OFFICE
CERTIFICATE OF CORRECTION

PATENT NO. : 4,171,401
DATED : October 16, 1979
INVENTOR(S) : Georges Legrix, et al It is certified that error appears in the above—identified patent and that said Letters Patent is hereby corrected as shown below:

Column 1, line 58: "espcially" should be --especially--.

line 67: "parallepipeds" should be --parallelepipeds--.

Column 2, line 12: "parallepipeds" should be --parallelepipeds--.

line 29: "do" should be --to--; after "chips" insert a comma.

Column 6, line 18: Change "extrudate" to --extruder--.

Column 7, line 37: Change "indicted" to --indicated--.

line 62: "c,c'" should be --C,C'--.

Column 9, line 20: Change "accordeon-like" to --accordion-like--.

line 53: "extrude" should be --extrudate--.

lines 64-65: Change "cyclicly" to --cyclically--.

UNITED STATES PATENT AND TRADEMARK OFFICE
CERTIFICATE OF CORRECTION

PATENT NO. : 4,171,401
DATED : October 16, 1979
INVENTOR(S) : Georges Legrix, et al It is certified that error appears in the above—identified patent and that said Letters Patent is hereby corrected as shown below:

Column 11, line 14: Change "accordeon-like" to --accordion-like--.

*Signed and Sealed this*

*Eighteenth* Day of *March 1980*

[SEAL]

Attest:

SIDNEY A. DIAMOND

*Attesting Officer*   *Commissioner of Patents and Trademarks*